C. E. TERWILLIGER.
ELECTRICALLY HEATED COOKER.
APPLICATION FILED OCT. 15, 1910.
990,927.
Patented May 2, 1911.
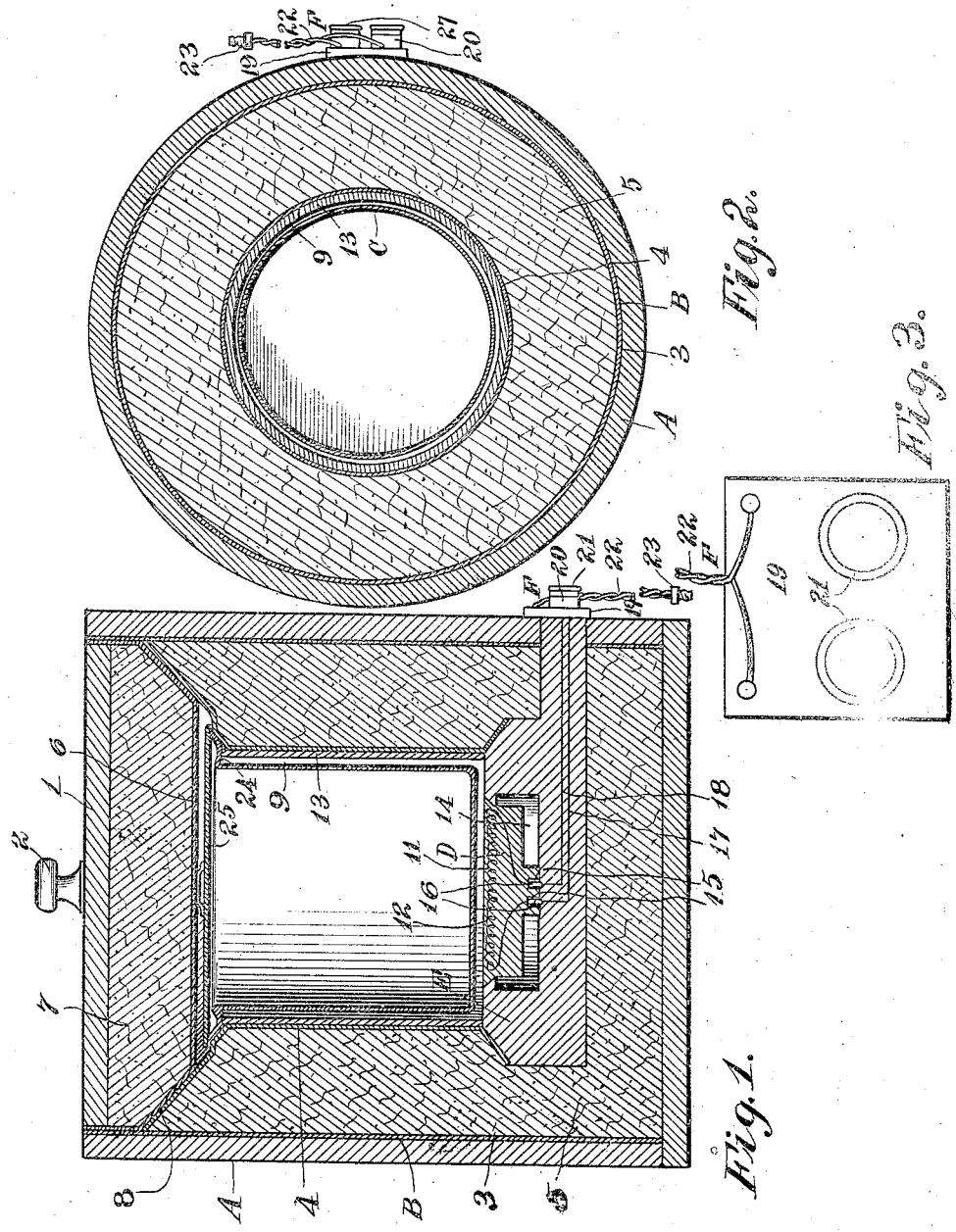
Witnesses
Thos. F. Knox,
C. Br———
Inventor
Charles E. Terwilliger
By Victor J. Evans
Attorney

UNITED STATES PATENT OFFICE.

CHARLES E. TERWILLIGER, OF SANTA CRUZ, CALIFORNIA.

ELECTRICALLY-HEATED COOKER.

990,927.  Specification of Letters Patent.  Patented May 2, 1911.

Application filed October 15, 1910. Serial No. 587,306.

*To all whom it may concern:*

Be it known that I, CHARLES E. TERWILLIGER, a citizen of the United States, residing at Santa Cruz, in the county of Santa Cruz and State of California, have invented new and useful Improvements in Electrically-Heated Cookers, of which the following is a specification.

This invention relates to cookers of the semi-fireless type and has for its principal object to provide a cooker which is electrically heated during the initial stage of the cooking operation.

Another object of the invention is to improve and simplify the construction of devices of this character so as to be comparatively simple and inexpensive to manufacture, and highly effective in operation.

With these objects in view and others, as will appear as the description proceeds, the invention comprises the various novel features of construction and arrangement of parts which will be more fully described hereinafter and set forth with particularity in the claims appended hereto.

In the accompanying drawing, which illustrates one embodiment of the invention:—Figure 1 is a central vertical section of the cooker. Fig. 2 is a horizontal section of the cooker taken in a plane passing through the food container of the cooker. Fig. 3 is a detail view of the fuse device for the electric circuit.

Similar reference characters are employed to designate corresponding parts throughout the several views.

Referring to the drawing, A designates the casing of the cooker, which may be constructed of wood or other suitable material, the casing being open at the top and provided with a cover 1 that has a knob or handle 2. The cooker in the present instance is of the single compartment type, but it is to be understood that any number of compartments may be employed. Within the casing 1 is a cylinder heat retainer, designated generally by B, the same consisting of an outer shell or cylinder 3, which may be made of sheet metal and an inner cylinder or shell 4, which has its body portion spaced from the outer shell so that a comparatively wide annular chamber will be provided between the shells to receive a filling 5 of fireproof sawdust, hair, and other heat non-conducting material. The underside of the cover is provided with a shell 6, which is also provided with a heat retaining filling 7. The upper portion of the inner shell is expanded into a frusto-conical portion 8 so as to connect with the outer shell, and the shell portion of the cover is shaped to snugly fit on the part 8 which forms a seat for the cover.

The shell 4 includes a chamber 9 for the cooking utensil C, which may be of any approved construction, and at the bottom of this chamber is an electric heating element D, which consists of a disk-shaped body 11 of porcelain or other insulating material in which is embedded a heating wire 12. Surrounding the shell 4 is an asbestos lining 13 for preventing excessive heating of the filling 5 and to prevent heating of the said filling directly by the electric element D, the latter is set into an asbestos holder E which is molded into disk form with a chamber 14 that is large enough to receive the element D without the latter completely filling the chamber so that a surrounding air space will be provided. The shell 4 extends only to the device E which is embedded in the filling 5, and closes the bottom of the utensil chamber 9. The heating element D has sockets 15 which form terminals for the heating wire 12 and into these sockets project plugs 16 anchored in the bottom of the chamber 14 so that detachable connections can be provided between the leading wires 17 and 18 and the heating element, which latter is freely removable. The leading wires are embedded in the asbestos body E and having their outer ends connected with a fuse device F, fastened to the outside of the casing A. Said device consists of an insulating piece 19, sockets 20, and fuse plugs 21. The fuse plugs F can be connected with any heating or lighting circuit by means of a cord conductor 22 having an attaching socket 23.

The cooking utensil is preferably provided with a trough-shaped annular rim 24 at its top edge, and the cover 25 rests on this rim so that any vapor rising out of the utensil will be collected in the trough of the rim.

In using the device, the cooking utensil with the food therein is placed in the chamber 9 and the cover 1 inserted in place. When the current is now turned on, the heating element will become hot and transfer its heat to the cooking utensil and heat is prevented from radiating from the latter by the effective heat retainer formed by the asbestos lining 13, filling 5, and device E. After the utensil has been heated for a sufficient time, the current is turned off and the cooking allowed to continue after the principle of the well known fireless cooker.

From the foregoing description taken in connection with the accompanying drawings, the advantages of the construction and of the method of operation will be readily apparent to those skilled in the art to which the invention relates, and while I have described the principle of operation of the invention, together with the device which I now consider to be the best embodiment thereof, I desire to have it understood that the device shown is merely illustrative and that such changes may be made when desired as are within the scope of the claims.

What I claim as new and desire to secure by Letters Patent is:—

1. A cooking device of the class described comprising a casing, inner and outer shells disposed therein, a heat retaining filling between the shells, a cooking utensil within the inner shell, a heating element under the utensil, a chambered holder of non-conducting material disposed at the bottom of the inner shell and containing the said element, and means in the said holder for supplying current to the element.

2. A cooking device of the class described comprising a casing, inner and outer shells disposed therein, a heat retaining filling between the shells, a cooking utensil within the inner shell, a heating element under the utensil, a chambered holder of non-conducting material disposed at the bottom of the inner shell and containing the said element, conductors embedded in the said holder for supplying current to the heating element, and a fuse device mounted on the casing and connected with the said conductors.

3. A cooker of the class described comprising a casing, a heat retaining device therein, a utensil disposed in the device, an asbestos disk-like holder arranged under the utensil and formed with a chamber in its top surface, a disk-like heating element removably mounted in the chamber, conductors in the said holder, detachable plug and socket contact devices between the element and said conductors, means for connecting the conductors with an electric circuit, and a cover for the said casing.

4. A device of the class described comprising a casing, a heat retaining means therein, a cooking vessel disposed in the retainer, an electric heating element for the vessel, a trough surrounding the top of the vessel, a cover disposed over the vessel and extending over the trough, and a cover set into the casing.

In testimony whereof I affix my signature in presence of two witnesses.

CHARLES E. TERWILLIGER.

Witnesses:
 NELLA STEELE,
 EMMET C. RITTENHOUSE.